US012112418B2

United States Patent
Tashiro et al.

(10) Patent No.: US 12,112,418 B2
(45) Date of Patent: *Oct. 8, 2024

(54) VOLUMETRIC CAPTURE AND MESH-TRACKING BASED MACHINE LEARNING 4D FACE/BODY DEFORMATION TRAINING

(71) Applicant: SONY GROUP CORPORATION, Tokyo (JP)

(72) Inventors: Kenji Tashiro, San Jose, CA (US); Qing Zhang, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,659

(22) Filed: Mar. 23, 2023

(65) Prior Publication Data

US 2023/0230304 A1    Jul. 20, 2023

Related U.S. Application Data

(63) Continuation of application No. 17/219,698, filed on Mar. 31, 2021, now Pat. No. 11,640,687.

(Continued)

(51) Int. Cl.
*G06T 13/40* (2011.01)
*G06N 20/00* (2019.01)
(Continued)

(52) U.S. Cl.
CPC ............. *G06T 13/40* (2013.01); *G06N 20/00* (2019.01); *G06T 17/20* (2013.01); *G06V 40/103* (2022.01); *G06V 40/23* (2022.01)

(58) Field of Classification Search
CPC ......... G06N 20/00; G06T 7/292; G06T 17/20; G06T 17/00; G06T 13/40; G06T 7/251;
(Continued)

(56) References Cited

U.S. PATENT DOCUMENTS 11,158,121 B1 * 10/2021 Tung ....................... G06N 3/045
2018/0241938 A1 * 8/2018 Buibas ................. H04N 13/243
(Continued)

FOREIGN PATENT DOCUMENTS

CN       108022278 A     5/2018
JP      2011521357 A     7/2011
(Continued)

OTHER PUBLICATIONS

Meekyoung Kim et al: "Data-driven physics for human soft tissue animation", ACM Transactions on Graphics, ACM, NY, US, vol. 36, No. 4, Jul. 20, 2017 (Jul. 20, 2017), pp. 1-12, XP058372828, ISSN: 0730-0301, DOI: 10.1145/3072959.3073685 * abstract.

*Primary Examiner* — Xilin Guo
(74) *Attorney, Agent, or Firm* — Haverstock & Owens, A Law Corporation

(57) ABSTRACT

Mesh-tracking based dynamic 4D modeling for machine learning deformation training includes: using a volumetric capture system for high-quality 4D scanning, using mesh-tracking to establish temporal correspondences across a 4D scanned human face and full-body mesh sequence, using mesh registration to establish spatial correspondences between a 4D scanned human face and full-body mesh and a 3D CG physical simulator, and training surface deformation as a delta from the physical simulator using machine learning. The deformation for natural animation is able to be predicted and synthesized using the standard MoCAP animation workflow. Machine learning based deformation synthesis and animation using standard MoCAP animation workflow includes using single-view or multi-view 2D videos of MoCAP actors as input, solving 3D model parameters (3D solving) for animation (deformation not included), and given 3D model parameters solved by 3D solving, predicting 4D surface deformation from ML training.

15 Claims, 3 Drawing Sheets

Related U.S. Application Data

(60) Provisional application No. 63/003,097, filed on Mar. 31, 2020.

(51) Int. Cl.
*G06T 17/20*      (2006.01)
*G06V 40/10*      (2022.01)
*G06V 40/20*      (2022.01)

(58) Field of Classification Search
CPC ........... G06T 19/20; G06T 2207/10028; G06T 2207/30201; G06T 2219/2021; G06T 17/205; G06V 40/23; G06V 40/103; G06V 20/647; G06V 40/10; G06V 40/171; H04L 67/535; H04L 9/3228
See application file for complete search history.

(56) References Cited

U.S. PATENT DOCUMENTS

| | | | |
|---|---|---|---|
| 2020/0090408 A1* | 3/2020 | Virkar | G06V 10/764 |
| 2021/0035347 A1* | 2/2021 | Casas Guix | G06T 13/40 |

FOREIGN PATENT DOCUMENTS

| | | | |
|---|---|---|---|
| JP | 2020518080 A | 6/2020 | |
| JP | 2021530815 A | 11/2021 | |
| KR | 20190129985 A | 11/2019 | |
| WO | WO-2019017985 A1 | 1/2019 | |
| WO | WO-2019207176 A1 | 10/2019 | |

* cited by examiner

VOLUMETRIC CAPTURE AND MESH-TRACKING BASED MACHINE LEARNING 4D FACE/BODY DEFORMATION TRAINING

CROSS-REFERENCE TO RELATED APPLICATION(S)

This application is a continuation application of co-pending U.S. patent application Ser. No. 17/219,698, filed Mar. 31, 2021 and titled "VOLUMETRIC CAPTURE AND MESH-TRACKING BASED MACHINE LEARNING 4D FACE/BODY DEFORMATION TRAINING," which claims priority under 35 U.S.C. § 119(e) of the U.S. Provisional Patent Application Ser. No. 63/003,097, filed Mar. 31, 2020 and titled, "VOLUMETRIC CAPTURE AND MESH-TRACKING BASED MACHINE LEARNING 4D FACE/BODY DEFORMATION TRAINING," which are hereby incorporated by reference in their entireties for all purposes.

FIELD OF THE INVENTION

The present invention relates to three dimensional computer vision and graphics for the entertainment industry. More specifically, the present invention relates to acquiring and processing three dimensional computer vision and graphics for film, TV, music and game content creation.

BACKGROUND OF THE INVENTION

Virtual human creation is highly manual and time-consuming and expensive. Rather than hand-crafting CG artwork from scratch, the recent trend is to efficiently create realistic digital human model by multi-view camera 3D/4D scanners. Various 3D scanner studios (3Lateral, Avatta, TEN24, Pixel Light Effect, Eisko) and 4D scanner studio (4DViews, Microsoft, 8i, DGene) exist world-wide for camera captured based human digitization.

A photo-based 3D scanner studio consists of multiple array of high resolution photography cameras. The prior art of 3D scan typically is used to create rigged modeling and requires hand-crafting for animation as it does not capture deformation. Video based 4D scanner (4D=3D+time) studio consists of multiple array of high frame rate machine vision cameras. It captures natural surface dynamics, but due to fixed videos and actions, it cannot create novel face expression or body action. Dummy actors need to perform many sequences of actions, meaning a huge workload for the actor.

SUMMARY OF THE INVENTION

Mesh-tracking based dynamic 4D modeling for machine learning deformation training includes: using a volumetric capture system for high-quality 4D scanning, using mesh-tracking to establish temporal correspondences across a 4D scanned human face and full-body mesh sequence, using mesh registration to establish spatial correspondences between a 4D scanned human face and full-body mesh and a 3D CG physical simulator, and training surface deformation as a delta from the physical simulator using machine learning. The deformation for natural animation is able to be predicted and synthesized using the standard MoCAP animation workflow. Machine learning based deformation synthesis and animation using standard MoCAP animation workflow includes using single-view or multi-view 2D videos of MoCAP actors as input, solving 3D model parameters (3D solving) for animation (deformation not included), and based on 3D model parameters solved by 3D solving, predicting 4D surface deformation from ML training.

In one aspect, a method programmed in a non-transitory of a device comprises using mesh-tracking to establish temporal correspondences across a 4D scanned human face and full-body mesh sequence, using mesh registration to establish spatial correspondences between the 4D scanned human face and full-body mesh sequence and a 3D computer graphics physical simulator and training surface deformation as a delta from the 3D computer graphics physical simulator using machine learning. The method further comprises using a volumetric capture system for high-quality 4D scanning. The volumetric capture system is configured for capturing high quality photos and video simultaneously. The method further comprises acquiring multiple, separate 3D scans. The method further comprises predicting and synthesizing the deformation for natural animation using a standard motion capture animation. The method further comprises using single-view or multi-view 2D videos of motion capture actors as input, solving 3D model parameters for animation, and based on the 3D model parameters solved by 3D solving, predicting 4D surface deformation from machine learning training.

In another aspect, an apparatus comprises a non-transitory memory for storing an application, the application for: using mesh-tracking to establish temporal correspondences across a 4D scanned human face and full-body mesh sequence, using mesh registration to establish spatial correspondences between the 4D scanned human face and full-body mesh sequence and a 3D computer graphics physical simulator and training surface deformation as a delta from the 3D computer graphics physical simulator using machine learning and a processor coupled to the memory, the processor configured for processing the application. The application is further configured for using a volumetric capture system for high-quality 4D scanning. The volumetric capture system is configured for capturing high quality photos and video simultaneously. The application is further configured for acquiring multiple, separate 3D scans. The application is further configured for predicting and synthesizing the deformation for natural animation using a standard motion capture animation. The application is further configured for: using single-view or multi-view 2D videos of motion capture actors as input, solving 3D model parameters for animation and based on the 3D model parameters solved by 3D solving, predicting 4D surface deformation from machine learning training.

In another aspect, a system comprising: a volumetric capture system for high-quality 4D scanning and a computing device configured for: using mesh-tracking to establish temporal correspondences across a 4D scanned human face and full-body mesh sequence, using mesh registration to establish spatial correspondences between the 4D scanned human face and full-body mesh sequence and a 3D computer graphics physical simulator and training surface deformation as a delta from the 3D computer graphics physical simulator using machine learning. The computing device is further configured for predicting and synthesizing the deformation for natural animation using a standard motion capture animation. The computing device is further configured for: using single-view or multi-view 2D videos of motion capture actors as input, solving 3D model parameters for animation and based on the 3D model parameters solved by 3D solving, predicting 4D surface deformation from machine learning training. The volumetric capture system is configured for capturing high quality photos and video simultaneously.

In another aspect, a method programmed in a non-transitory of a device comprises using single-view or multi-view 2D videos of motion capture actors as input, solving 3D model parameters for animation and based on the 3D model parameters solved by 3D solving, predicting 4D surface deformation from machine learning training.

DETAILED DESCRIPTION OF THE PREFERRED EMBODIMENT

Figure 1A:
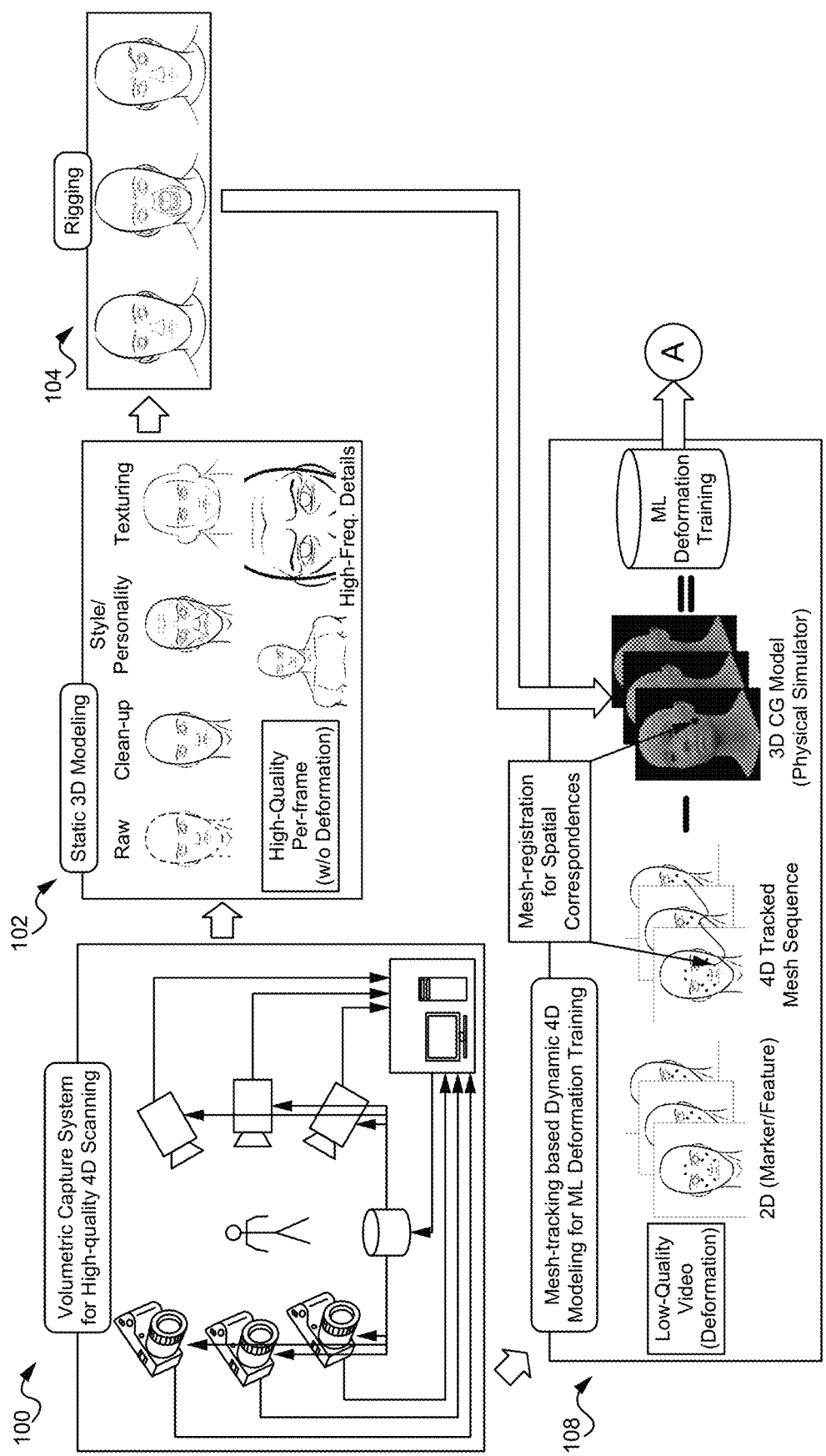
FIGS. 1A-1B illustrate a flowchart of a method of implementing volumetric capture and mesh-tracking based machine learning 4D face/body deformation training for time/cost efficient game character's natural animation according to some embodiments.

Unlike the prior art 3D scan technology, the deformation training implementation described herein is able to generate dynamic face and full-body modeling with implicit deformations by machine learning (ML), that is the synthesis of arbitrary novel action of face expression or body language with natural deformation.

The approach described herein is based on photo-video capture from a "photo-video volumetric capture system." Photo-video based capture is described in PCT Patent Application PCT/US2019/068151, filed Dec. 20, 2019 titled, PHOTO-VIDEO BASED SPATIAL-TEMPORAL VOLUMETRIC CAPTURE SYSTEM FOR DYNAMIC 4D HUMAN FACE AND BODY DIGITIZATION, which is hereby incorporated by reference in its entirety for all purposes. As described, the photo-video capture system is able to capture high fidelity texture in sparse time, and between the photo captures, video is captured, and the video is able to be used to establish the correspondence (e.g., transition) between the sparse photos. The correspondence information is able to be used to implement mesh tracking.

Game studios use Motion Capture (MoCAP) (ideally face/body unified as natural motion capture) in the animation workflow, but it does not automatically generate animation with natural surface deformation (e.g., flesh dynamics). Typically, game Computer Graphics (CG) designers add hand-crafted deformation (4D) on top of a 3D rigged model, and this is time-consuming.

Other systems generate natural animation with deformation, but still have a high-level of manual (hand-crafted) work. Such systems are not automated by Machine Learning (ML) training. Other systems may synthesize deformation of face animation, but require a new workflow (e.g., not friendly to the standard MoCAP workflow).

Described herein is mesh-tracking based dynamic 4D modeling for ML deformation training. The mesh-tracking based dynamic 4D modeling for ML deformation training includes: using a volumetric capture system for high-quality 4D scanning, using mesh-tracking to establish temporal correspondences across a 4D scanned human face and full-body mesh sequence, using mesh registration to establish spatial correspondences between a 4D scanned human face and full-body mesh and a 3D CG physical simulator, and training surface deformation as a delta from the physical simulator using machine learning. The deformation for natural animation is able to be predicted and synthesized using the standard MoCAP animation workflow. Machine learning based deformation synthesis and animation using standard MoCAP animation workflow includes using single-view or multi-view 2D videos of MoCAP actors as input, solving 3D model parameters (3D solving) for animation (deformation not included), and based on 3D model parameters solved by 3D solving, predicting 4D surface deformation from ML training.

When modeling, there is a face process and a body process. As described herein, in some embodiments, both the face process and body process are photo-based, meaning a photo camera is used to acquire the content for input, instead of a video camera. Using the photo camera acquired input, a model is generated by capturing many different poses (e.g., arms up, arms down, body twisted, arms to the side, legs straight) with the muscle deformation. Depending on the pose, a closest shape or shapes are determined (e.g., using a matching technology). Then, multiple shapes are fused such that the muscle deformation is more realistic. In some embodiments, the captured information is sparsely populated. From the sparse sensing, the system is able to inversely map what the model motion should be. The sparse sensing is able to be mapped to dense modeling mapping, so the iteration process happens many times. The modeling designer generates a model from a photo (e.g., 3D scan), and the designer tries to mimic the animation which is 4D (3D+time). The animation group animates from the sparse motion capture, but since the sensing is sparse, mapping may be difficult, so many iterations occur. However, this implementation is able to be improved.

Face and body modeling is based on a blank shape; the blank shape is based on a photo; and the photo is 3D-based (e.g., no deformation information). There is no transitional state of the surface since each state is a sparse 3D scan. Sensing is sparse as well, but a high-quality model is animated in time.

There are many examples of mesh-tracking techniques such as U.S. Pat. No. 10,431,000, filed Jul. 18, 2017, titled, ROBUST MESH TRACKING AND FUSION BY USING PART-BASED KEY FRAMES AND PRIORI MODEL. Another example is Wrap4D which takes a sequence of textured 3D scans as an input and produces a sequence of meshes with a consistent topology as an output.

During the capture time, there is 4D capture (e.g., able to see face and/or body), and it is possible to see how the muscles move. For example, the target subject is able to be requested to move, and the muscle will deform. For a very complex situation, this is very difficult for an animator to do. Any complex muscle deformation is learned during the modeling stage. This enables synthesis in the animation stage. This also enables the modifications to be incorporated in the current MoCAP workflow. Using the ML, if the motion is captured during the production stage, since the sensing is sparse, the system densifies the motion (e.g., deformation). In some embodiments, the deformation is already known from the photo-video capture.

Figure 1B:
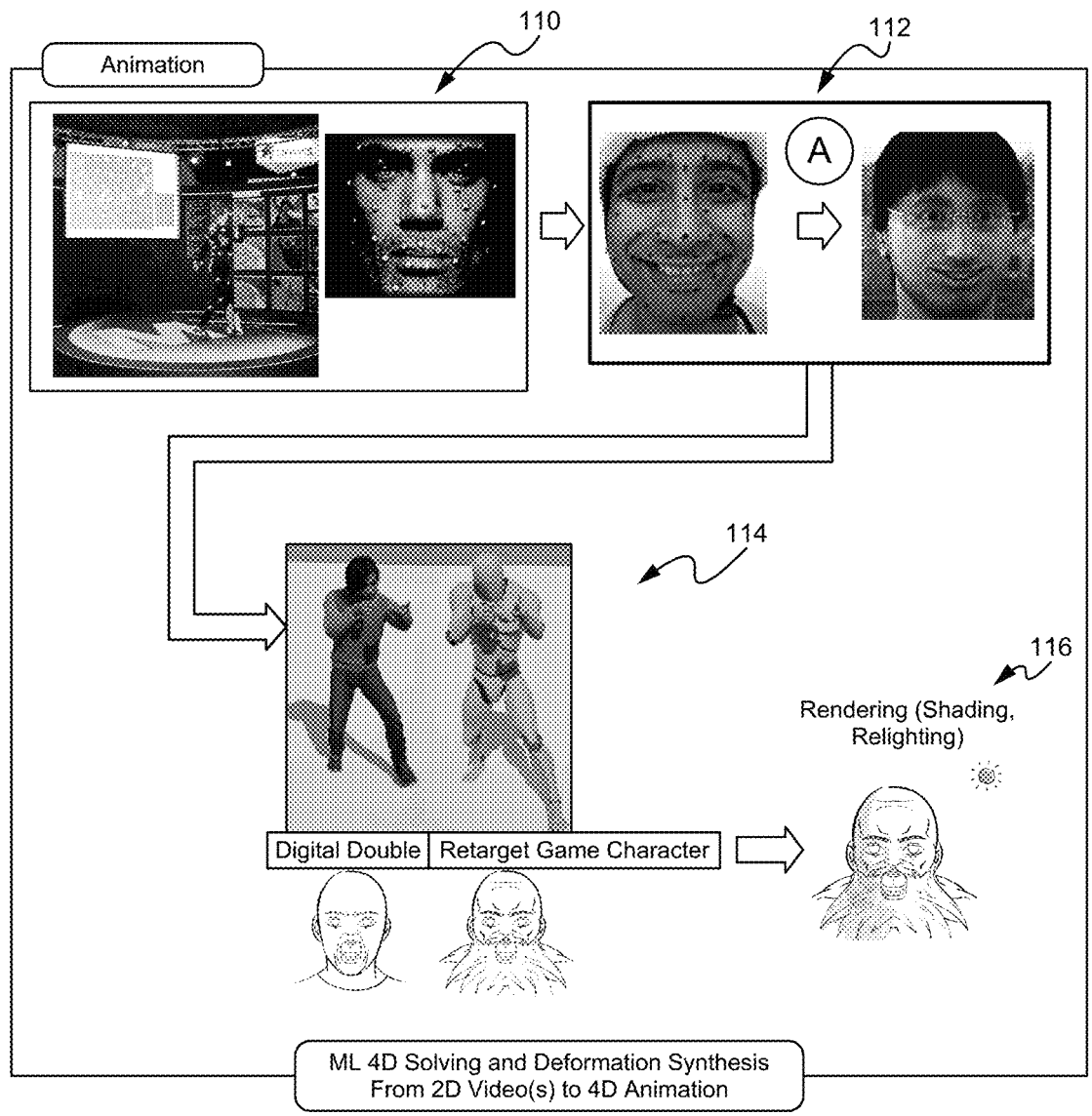

FIGS. 1A-1B illustrate a flowchart of a method of implementing volumetric capture and mesh-tracking based machine learning 4D face/body deformation training for time/cost efficient game character's natural animation according to some embodiments.

In the step 100, a volumetric capture system is utilized for high-quality 4D scanning. As described in PCT Patent Application PCT/US2019/068151, the volumetric capture system is able to acquire photos and videos simultaneously for high-quality 4D scanning. The high-quality 4D scanning includes denser camera views for high-quality modeling. In some embodiments, instead of utilizing the volumetric capture system, another system for acquiring 3D content and time information is utilized. For example, at least two separate 3D scans are acquired. Furthering the example, the separate 3D scans are able to be captured and/or downloaded.

In the step 102, static 3D modeling is implemented. Once high quality information is captured for the scanning, linear modeling is implemented using a static 3D model. However, because 4D capture (photo and video capture and time) is implemented, a correspondence is able to be established quickly, which is able to used to generate the character model. The static 3D modeling starts with a raw image, then the image is cleaned up, style/personality features are applied, and texturing is performed such that a high-quality per-frame without deformation is generated. High-frequency details are also applied.

In the step 104, rigging is performed. Rigging is a technique in computer animation in which a character is represented in two parts: a surface representation used to draw the character (e.g., mesh or skin) and a hierarchical set of interconnected parts (e.g., bones forming the skeleton). Rigging is able to be performed in any manner.

In the step 108, mesh-tracking based dynamic 4D modeling for ML deformation training is implemented. The low-quality video is able to be used to improve the mesh-tracking for temporal correspondences. A delta between the character model versus the 4D capture is able to be generated. The delta is able to be used for ML deformation training. An example of a delta training technique includes: an Implicit Part Network (IP-Net) which combines detail-rich implicit functions and parametric representations in order to reconstruct 3D models of people that remain controllable and accurate even in the presence of clothing. Given sparse 3D point clouds sampled on the surface of a dressed person, an Implicit Part Network (IP-Net) is used to jointly predict the outer 3D surface of the dressed person, the and inner body surface, and the semantic correspondences to a parametric body model. Correspondences are subsequently used to fit the body model to the inner surface and then non-rigidly deform it (under a parametric body+displacement model) to the outer surface in order to capture garment, face and hair detail. The exemplary IP-Net is further described by Bharat Lal Bhatnagar et al., "Combining Implicit Function Learning and Parametric Models for 3D Human Reconstruction," (Cornell University, 2020).

Once mesh tracking is implemented (e.g., establishing correspondence between frames), delta information is able to be determined. With the delta information, training is able to be implemented. Based on the training knowledge, it is possible to synthesize during MoCAP workflow.

In the step 110, MoCAP information is acquired. MoCAP information is able to be acquired in any manner. For example, the standard motion capture where a target wears a specialized suit with markings is implemented. A face/body unified MoCap is able to be implemented. By capturing the face and body together, the fit is more natural.

In the step 112, ML 4D solving and deformation synthesis from 2D videos to 4D animation is implemented. MoCAP information is able to be used for the 4D ML solving and deformation synthesis. In some embodiments, an inverse mapping is applied. Solving involves mapping MoCap information to a model. The input is sparse, but the dense mapping is solved for. ML using volumetric captured data is able to be used for implicit 4D solving.

In the step 114, retargeting is applied where the character model is applied to the 4D animation with natural deformation. Retargeting includes face retargeting and whole body retargeting.

In the step 116, rendering, including shading and relighting, is implemented to render a final video.

In some embodiments, fewer or additional steps are implemented. In some embodiments, the order of the steps is modified.

Unlike previous implementations which utilize a dense camera setup close to the target subject's face, the system described herein focuses on motion and uses a camera setup that is far from the target subject to capture sparse motion (e.g., skeletal motion). Additionally, with the system described herein, a larger field of view is possible with more body and face animation.

Figure 2:
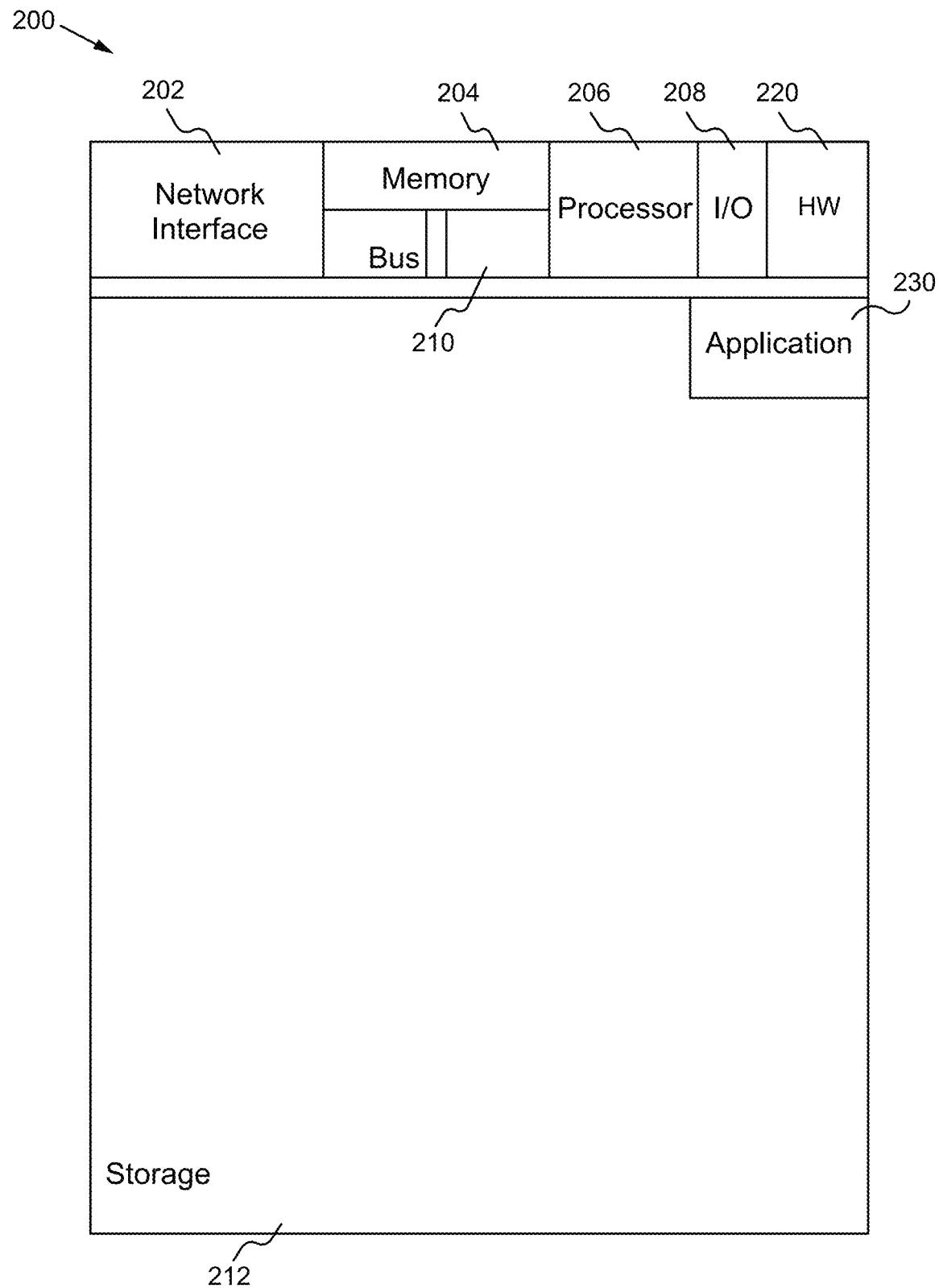
FIG. 2 illustrates a block diagram of an exemplary computing device configured to implement the deformation training method according to some embodiments.

FIG. 2 shows a block diagram of an exemplary computing device configured to implement the deformation training method according to some embodiments. The computing device 200 is able to be used to acquire, store, compute, process, communicate and/or display information such as images and videos. The computing device 200 is able to implement any of the deformation training aspects. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, High Definition disc/drive, ultra-HD drive, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, screen, printer, modem, touchscreen, button interface and other devices. Deformation training application(s) 230 used to implement the deformation training method are likely to be stored in the storage device 212 and memory 204 and processed as applications are typically processed. More or fewer components shown in FIG. 2 are able to be included in the computing device 200. In some embodiments, deformation training hardware 220 is included. Although the computing device 200 in FIG. 2 includes applications 230 and hardware 220 for the deformation training method, the deformation training method is able to be implemented on a computing device in hardware, firmware, software or any combination thereof. For example, in some embodiments, the deformation training applications 230 are programmed in a memory and executed using a processor. In another example, in some embodiments, the deformation training hardware 220 is programmed hardware logic including gates specifically designed to implement the deformation training method.

In some embodiments, the deformation training application(s) 230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the deformation training method described herein, devices such as digital cameras/camcorders/computers are used to acquire content and then the same devices or one or more additional devices analyze the content. The deformation training method is able to be implemented with user assistance or automatically without user involvement to perform deformation training.

In operation, the deformation training method provides a more accurate and efficient deformation and animation method.

Using the mesh tracking dynamic 4D model, it is possible to generate correpondences, which enables ML training. Without the correspondence information, it may not be possible to determine deformation information (e.g., how shoulder muscle deforms upon moving). Using mesh tracking on the 4D volumetric capture, the deformation information is able to be determined. Once the ML takes place, there is a delta for the face and body, and then the information is able to be used for animation. The animator uses the character for storytelling. But since the detail information may be too heavy, the detailed information is saved on the side for later use. The animator uses a "light" model (e.g., without the detailed information) initially.

Machine learning based deformation synthesis and animation using standard MoCAP animation workflow uses sparse sensing. With sparse sensing, a wider field of view is possible, so face and body are able to be captured together. Instead of using the time-consuming, hand-crafted information to fill in the gaps of the sparse sensing, surface dynamics deformation is learned during the modeling stage using the photo-video volumetric capture, and is then used during the animation stage. A game studio is able to use their standard MoCap workflow. This provides efficiency and quality improvements in many aspects of the process.

Some Embodiments of Volumetric Capture and Mesh-Tracking Based Machine Learning 4D Face/Body Deformation Training 1. A method programmed in a non-transitory of a device comprising:
    using mesh-tracking to establish temporal correspondences across a 4D scanned human face and full-body mesh sequence;
    using mesh registration to establish spatial correspondences between the 4D scanned human face and full-body mesh sequence and a 3D computer graphics physical simulator; and
    training surface deformation as a delta from the 3D computer graphics physical simulator using machine learning.
2. The method of clause 1 further comprising using a volumetric capture system for high-quality 4D scanning
3. The method of clause 2 wherein the volumetric capture system is configured for capturing high quality photos and video simultaneously.
4. The method of clause 1 further comprising acquiring multiple, separate 3D scans.
5. The method of clause 1 further comprising predicting and synthesizing the deformation for natural animation using a standard motion capture animation.
6. The method of clause 1 further comprising:
    using single-view or multi-view 2D videos of motion capture actors as input;
    solving 3D model parameters for animation; and
    based on the 3D model parameters solved by 3D solving, predicting 4D surface deformation from machine learning training.
7. An apparatus comprising:
    a non-transitory memory for storing an application, the application for:
        using mesh-tracking to establish temporal correspondences across a 4D scanned human face and full-body mesh sequence;
        using mesh registration to establish spatial correspondences between the 4D scanned human face and full-body mesh sequence and a 3D computer graphics physical simulator; and
        training surface deformation as a delta from the 3D computer graphics physical simulator using machine learning; and
    a processor coupled to the memory, the processor configured for processing the application.
8. The apparatus of clause 7 wherein the application is further configured for using a volumetric capture system for high-quality 4D scanning
9. The apparatus of clause 8 wherein the volumetric capture system is configured for capturing high quality photos and video simultaneously.
10. The apparatus of clause 7 wherein the application is further configured for acquiring multiple, separate 3D scans.
11. The apparatus of clause 7 wherein the application is further configured for predicting and synthesizing the deformation for natural animation using a standard motion capture animation.
12. The apparatus of clause 7 wherein the application is further configured for:
    using single-view or multi-view 2D videos of motion capture actors as input;
    solving 3D model parameters for animation; and
    based on the 3D model parameters solved by 3D solving, predicting 4D surface deformation from machine learning training.
13. A system comprising:
    a volumetric capture system for high-quality 4D scanning; and
    a computing device configured for:
        using mesh-tracking to establish temporal correspondences across a 4D scanned human face and full-body mesh sequence;
        using mesh registration to establish spatial correspondences between the 4D scanned human face and full-body mesh sequence and a 3D computer graphics physical simulator; and
        training surface deformation as a delta from the 3D computer graphics physical simulator using machine learning.
14. The system of clause 13 wherein the computing device is further configured for predicting and synthesizing the deformation for natural animation using a standard motion capture animation.
15. The system of clause 13 wherein the computing device is further configured for:

using single-view or multi-view 2D videos of motion capture actors as input;
solving 3D model parameters for animation; and
based on the 3D model parameters solved by 3D solving, predicting 4D surface deformation from machine learning training.

16. The system of clause 13 wherein the volumetric capture system is configured for capturing high quality photos and video simultaneously.

17. A method programmed in a non-transitory of a device comprising:
using single-view or multi-view 2D videos of motion capture actors as input;
solving 3D model parameters for animation; and
based on the 3D model parameters solved by 3D solving, predicting 4D surface deformation from machine learning training.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
using a volumetric capture system for high-quality 4D scanning, wherein the volumetric capture system is configured for capturing high quality photos and video simultaneously;
using mesh-tracking to establish temporal correspondences across a 4D scanned human face and full-body mesh sequence;
using mesh registration to establish spatial correspondences between the 4D scanned human face and full-body mesh sequence and a 3D computer graphics physical simulator; and
training surface deformation as a delta from the 3D computer graphics physical simulator using machine learning including combining detail-rich implicit functions and parametric representations to construct 3D models.

2. The method of claim 1 further comprising acquiring multiple, separate 3D scans.

3. The method of claim 1 further comprising predicting and synthesizing the deformation for natural animation using a standard motion capture animation.

4. The method of claim 1 further comprising:
using single-view or multi-view 2D videos of motion capture actors as input;
solving 3D model parameters for animation; and
based on the 3D model parameters solved by 3D solving, predicting 4D surface deformation from machine learning training.

5. An apparatus comprising:
a non-transitory memory for storing an application, the application for:
using a volumetric capture system for high-quality 4D scanning, wherein the volumetric capture system is configured for capturing high quality photos and video simultaneously;
using mesh-tracking to establish temporal correspondences across a 4D scanned human face and full-body mesh sequence;
using mesh registration to establish spatial correspondences between the 4D scanned human face and full-body mesh sequence and a 3D computer graphics physical simulator; and
training surface deformation as a delta from the 3D computer graphics physical simulator using machine learning including combining detail-rich implicit functions and parametric representations to construct 3D models; and
a processor coupled to the memory, the processor configured for processing the application.

6. The apparatus of claim 5 wherein the application is further configured for acquiring multiple, separate 3D scans.

7. The apparatus of claim 5 wherein the application is further configured for predicting and synthesizing the deformation for natural animation using a standard motion capture animation.

8. The apparatus of claim 5 wherein the application is further configured for:
using single-view or multi-view 2D videos of motion capture actors as input;
solving 3D model parameters for animation; and
based on the 3D model parameters solved by 3D solving, predicting 4D surface deformation from machine learning training.

9. A system comprising:
a volumetric capture system for high-quality 4D scanning, wherein the volumetric capture system is configured for capturing high quality photos and video simultaneously; and
a computing device configured for:
using mesh-tracking to establish temporal correspondences across a 4D scanned human face and full-body mesh sequence;
using mesh registration to establish spatial correspondences between the 4D scanned human face and full-body mesh sequence and a 3D computer graphics physical simulator; and
training surface deformation as a delta from the 3D computer graphics physical simulator using machine learning including combining detail-rich implicit functions and parametric representations to construct 3D models.

10. The system of claim 9 wherein the computing device is further configured for predicting and synthesizing the deformation for natural animation using a standard motion capture animation.

11. The system of claim 9 wherein the computing device is further configured for:
using single-view or multi-view 2D videos of motion capture actors as input;
solving 3D model parameters for animation; and
based on the 3D model parameters solved by 3D solving, predicting 4D surface deformation from machine learning training.

12. A method programmed in a non-transitory memory of a device comprising:
capturing high quality photos and video simultaneously with a volumetric capture system for high-quality 4D scanning;
performing mesh-tracking to establish temporal correspondences across a 4D scanned human face and full-body mesh sequence;

performing mesh registration to establish spatial correspondences between the 4D scanned human face and full-body mesh sequence and a 3D computer graphics physical simulator; and training surface deformation as a delta from the 3D computer graphics physical simulator using machine learning including combining detail-rich implicit functions and parametric representations to construct 3D models.

13. The method of claim 12 further comprising acquiring multiple, separate 3D scans.

14. The method of claim 12 further comprising predicting and synthesizing the deformation for natural animation using a standard motion capture animation.

15. The method of claim 12 further comprising:
using single-view or multi-view 2D videos of motion capture actors as input;
solving 3D model parameters for animation; and
based on the 3D model parameters solved by 3D solving, predicting 4D surface deformation from machine learning training.

\* \* \* \* \*